ated July 9, 1963

United States Patent Office

3,097,130
COMBATING PLANT DISEASES CAUSED BY FUNGI
Erik Regel, Kansas City, Mo., and Richard Wegler, Leverkusen, Ferdinand Grewe, Cologne-Stammheim, and Helmut Kaspers, Leverkusen, Germany, assignors to Farbenfabriken Bayer Aktiengesellschaft, Leverkusen, Germany, a corporation of Germany
No Drawing. Filed Dec. 19, 1960, Ser. No. 131,448
Claims priority, application Germany Dec. 23, 1959
6 Claims. (Cl. 167—30)

The present invention relates to and has as its objects new and useful fungicidal compositions and methods of combating plant diseases caused by fungi. Generally the active ingredients of the present invention may be represented by the following general formula:

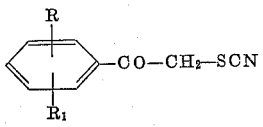

in which R and $R_1$ stand for lower alkyl radicals, lower alkoxy radicals or halogen atoms.

The use of p-chloro-ω-thiocyano-acetylbenzene for combating plant diseases caused by fungi is already known from German patent application No. 1,053,837.

In accordance with the present invention it has now been found that the above shown compounds possess a high fungicidal initial activity, but in addition, surprisingly, exhibit a greater stability towards usual atmospheric influences such as humidity, heat, light and the like. This is particularly true of compounds containing, in addition to the chlorine atom, one or more alkyl groups or a further halogen atom in the benzene nucleus such as 2-methyl-4-chloro-, 3-methyl-4-chloro- or 3,4-dichloro-ω-thiocyano-acetyl-benzene, or in which the chlorine atom is substituted by another radical, particularly an alkyl or alkoxy group such as in 4-methyl- or 4-methoxy-ω-thiocyano-acetyl-benzene. Since plants can only be selectively protected by practically all fungicidal active substances, the question of their stability and thus their permanent action is of outstanding economic importance.

The new fungicidal ω-thiocyano-acetylbenzenes can be obtained by known methods, i.e. e.g. by the same procedure as known for the preparation of p-chloro-ω-thiocyano-acetylbenzene.

The active substances according to the invention may be applied as dusts or sprays in combination with the diluents, dispersing agents, emulsifiers, wetting agents and adhesives commonly used for this purpose. They may further be applied together with other fungicidal, bactericidal or insecticidal substances.

The following examples are given for the purpose of illustrating the invention.

Examples

Acute fungitoxic action of some compounds to be used according to the invention.

| Active substance | Phytophthora infestans (on tomatoes) degree of infestation at active substance concentrations of— | |
|---|---|---|
| | 0.025% | 0.0125% |
| ![compound] CH₃-C₆H₄-CO-CH₂SCN | 3 | 12 |
| Cl-C₆H₃(CH₃)-CO-CH₂SCN | 11 | 22 |
| Cl-C₆H₃(H₃C)-CO-CH₂-SCN | 5 | 18 |
| Cl-C₆H₃(Cl)-CO-CH₂SCN | 11 | 25 |
| CH₃O-C₆H₄-CO-CH₂SCN | 31 | 38 |
| Br-C₆H₄-CO-CH₂-SCN | 6 | 21 |
| F-C₆H₄-CO-CH₂-SCN | 33 | 40 |
| Untreated (Check) | 100 | |

We claim:
1. A method of combating fungi which comprises treating a member selected from the group consisting of plants to be protected and the locus of infestation with a compound of the general formula:

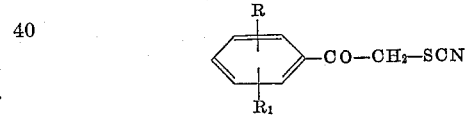

in which R stands for lower alkyl and $R_1$ stands for chlorine.

2. A method of combating fungi which comprises treating a member selected from the group consisting of plants to be protected and the locus of infestation with the following compound:

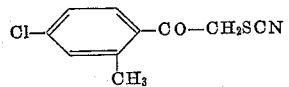

3. A method of combating fungi which comprises treating a member selected from the group consisting of plants to be protected and the locus of infestation with the following compound:

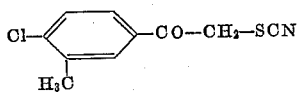

4. A method of combating fungi which comprises treating a member selected from the group consisting of plants to be protected and the locus of infestation with the following compound:

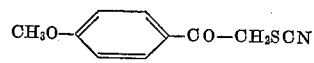

5. A method of combating plant fungus disease which comprises contacting the plant with an effective amount of a compound having the formula

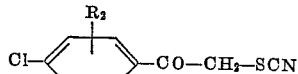

wherein $R_2$ is lower alkyl.

6. A method of combating plant fungus disease which comprises contacting the plant fungus with an effective amount of a compound of the general formula

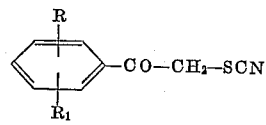

wherein R stands for lower alkoxy and $R_1$ stands for hydrogen.

References Cited in the file of this patent
UNITED STATES PATENTS
2,923,658    Regel _____ Feb. 2, 1960